United States Patent
Heine

[11] 3,866,104
[45] Feb. 11, 1975

[54] FIVE PHASE STEPPING MOTOR

[75] Inventor: Gunter Heine, Lahr, Germany

[73] Assignee: Gerhard Berger Fabrik Elektrischer Messgerate, Lahr, Germany

[22] Filed: July 16, 1973

[21] Appl. No.: 379,223

[30] Foreign Application Priority Data
July 18, 1972 Germany............................ 2235086

[52] U.S. Cl.................... 318/696, 310/49, 310/197, 318/138
[51] Int. Cl. ........................................... H02k 37/00
[58] Field of Search ............. 310/156, 182, 49, 254, 310/180, 182, 197; 318/690, 685, 254, 133

[56] References Cited
UNITED STATES PATENTS

| | | | |
|---|---|---|---|
| 3,453,512 | 7/1969 | Polakowski......................... | 318/254 |
| 3,510,699 | 5/1970 | Fredrickson........................ | 313/138 |
| 3,619,746 | 11/1971 | Thornton............................ | 318/254 |
| 3,621,312 | 11/1971 | Palmero............................. | 318/138 |

*Primary Examiner*—G. R. Simmons
*Attorney, Agent, or Firm*—Toren, McGeady and Stanger

[57] ABSTRACT

In the homopolar five phase stepping motor disclosed, five stator windings are distributed on $u$ groups each having five main poles and coacting with a permanent magnet rotor. Each pole has $n+1$ pole teeth. The five stator windings are connected in series to form a loop having five connecting points. A control switches five transfer switches having an armature connected to a connecting point, between a positive and negative potential so as simultaneously to energize four windings and short-circuit the fifth. The control means then shifts the short-circuited condition to other windings in cyclical sequence while energizing the remaining four windings at any time. The pole divisions exhibit the relationships $$\tau_p = n\,\tau_z + \alpha\ i\quad \alpha = \tau_z\,(K + 0.6)$$
$$\tau_p{'} = n\,\tau_z + \beta i\quad \beta = \tau_z\,(K' + 0.6)$$

The ratio of the rotor tooth widths to stator 2 widths at the outer diameter of the rotor is equal or smaller than unity. The number of rotor teeth $T_r = u\,(5n+4K+K'+3)$. In this relation $n$, $K$, and $K'$ are whole numbers and $\tau_p$, $\tau_p{'}$ and $\tau_z$ are pitches of adjacent main poles on adjacent groups and of adjacent pole teeth. The angles $\alpha$ and $\beta$ are pitches between adjacent teeth on adjacent poles and adjacent groups.

20 Claims, 31 Drawing Figures

FIG. I

STATOR WITH n = 3, K = 1, K'= 3, u = 2

FIG. I'

STATOR WINDINGS WITH
u = 2  IN CIRCUIT F1

FIG. 2

CIRCUIT F1

FIG. 3

CIRCUIT F2

ROTOR TEETH $Z_r$ AS A FUNCTION OF n, K, AND K'

| K' | K | 0 | 1 | 2 | 3 | 4 | 5 | 6 | 7 | 8 |
|---|---|---|---|---|---|---|---|---|---|---|
| 0 | 0 | 6 | 16 | 26 | 36 | 46 | 56 | 66 | 76 | 86 |
|   | 1 | 14 | 24 | 34 | 44 | 54 | 64 | 74 | 84 | 94 |
|   | 2 | 22 | 32 | 42 | 52 | 62 | 72 | 82 | 92 | 102 |
|   | 3 | 30 | 40 | 50 | 60 | 70 | 80 | 90 | 100 | 110 |
| 1 | 0 | 8 | 18 | 28 | 38 | 48 | 58 | 68 | 78 | 88 |
|   | 1 | 16 | 26 | 36 | 46 | 56 | 66 | 76 | 88 | 96 |
|   | 2 | 24 | 34 | 44 | 54 | 64 | 74 | 84 | 94 | 104 |
|   | 3 | 32 | 42 | 52 | 62 | 72 | 82 | 92 | 102 | 112 |
| 2 | 0 | 10 | 20 | 30 | 40 | 50 | 60 | 70 | 80 | 90 |
|   | 1 | 18 | 28 | 38 | 48 | 58 | 68 | 78 | 88 | 98 |
|   | 2 | 26 | 36 | 46 | 56 | 66 | 76 | 86 | 96 | 106 |
|   | 3 | 34 | 44 | 54 | 64 | 74 | 84 | 94 | 104 | 114 |
| 3 | 0 | 12 | 22 | 32 | 42 | 52 | 62 | 72 | 82 | 92 |
|   | 1 | 20 | 30 | 40 | 50 | 60 | 70 | 80 | 90 | 100 |
|   | 2 | 28 | 38 | 48 | 58 | 68 | 78 | 88 | 98 | 108 |
|   | 3 | 36 | 46 | 56 | 66 | 76 | 86 | 96 | 106 | 116 |

FIVE PHASE STEPPING MOTOR

REFERENCE TO RELATED COPENDING APPLICATION

This application is related to the copending application of Günter Heine, Carsten Dröge, and Bruno Borgononovi, Ser. No. 294,787, filed Oct. 4, 1972, entitled FIVE PHASE MOTOR STEPPING SYSTEMS, and assigned to the same assignee as the present application. The subject matter of that application is hereby made a part of the present application as if fully recited herein.

BACKGROUND OF THE INVENTION

This invention relates to stepping motors and particularly to five phase stepping motors operating on the homopolar principle.

Motors utilizing this principle in their operation can be constructed in a relatively simple manner and achieve very small stepping angles. Customarily, such motors utilize a two phase construction with 2 × 4 windings. However, presently known homopolar motors exhibit substantially smaller efficiencies than heteropolar motors. They are also subject to several unavoidable resonance areas, at which the motors can readily fall out of step in the absence of auxiliary external damping arrangements.

An object of this invention is to improve stepping motors.

Another object of this invention is to improve the efficiency or output of such five phase stepping motors.

Another object of this invention is to obtain large stepping frequencies at small stepping angles.

Yet another object of this invention is to assure satisfactory and stable stepping behavior at very large start and stop frequencies.

SUMMARY OF THE INVENTION

According to a feature of the invention, these objects are obtained, in whole or in part, in a multiphase stepping motor of the homopolar type, with a permanent magnet rotor, five stator windings distributed on small $u$ groups each having five main poles, each of the main poles having small $n+1$ pole teeth, a five phase control circuit controlling all the groups and simultaneously energizing four phases and short-circuiting the fifth and then shifting the short-circuited condition to the other phases in cyclical sequence while energizing the remaining four phases at any time, the pole division having the relationship $$\tau_p = n\tau_z + \alpha_i \quad \alpha = \tau_z(K + 0.6)$$

$$\tau_p' = n\tau_z + \beta_i \quad \beta = \tau_z(K' + 0.6)$$

wherein $\tau_p$ is the pitch between poles, $\tau_p$, is the pitch between adjacent poles of adjacent groups, $\tau_z$ is the pitch between teeth, $\alpha$ is the pitch between adjacent teeth of adjacent poles and $\beta$ is the pitch between adjacent teeth on adjacent groups, the ratio of the rotor tooth width to the stator tooth width at the outer diameter of the rotor being equal to or smaller than unity, and the number of rotor teeth $T_r = u(5n + 4K + K' + 3)$, where $n$, $K$, and $K'$ are whole numbers greater than or equal to zero.

These and other features of the invention are pointed out in the claims. Other objects and advantages of the invention will become evident from the following detailed description when read in light of the accompanying drawings.

BRIEF DESCRIPTION OF THE DRAWINGS

FIG. 1' is a somewhat schematic representation of details of a stator of the motor in FIG. 1 wherein $n = 3$, $K=1$, $K' = 3$, and $u = 2$;

DESCRIPTION OF PREFERRED EMBODIMENTS

Figure 1:
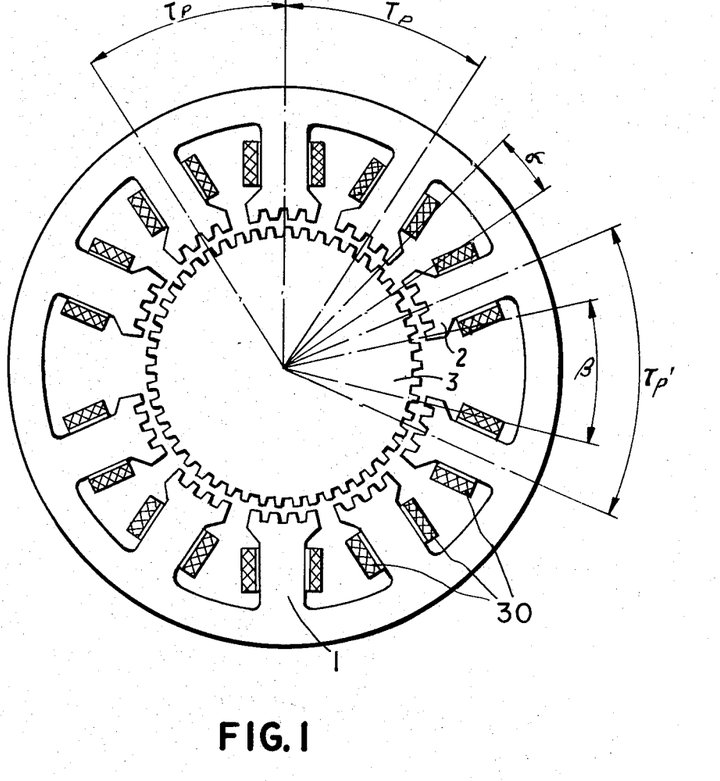
FIG. 1 is a somewhat schematic sectional view of a stepping motor embodying features of the invention.

In FIG. 1, the motor has five stator windings which may, for example, be applied on $10 = 5 \times u$ radially arranged stator main poles 1 with one or several pole teeth 2.

The stator body is composed of punched and superimposed sheets or plates. According to an embodiment, it is composed of one or several layer packets. According to an embodiment of the invention, the main poles 1 have $n + 1$ individual poles 2 wherein $n$ is a whole number equal to or greater than zero.

In the embodiment of FIG. 1, two main pole windings are connected for each phase in the same winding sense or direction. According to one embodiment of the invention, this is accomplished by a series connection. According to another embodiment of the invention, this is accomplished as shown in FIG. 2 by a parallel connection.

Figure 2:
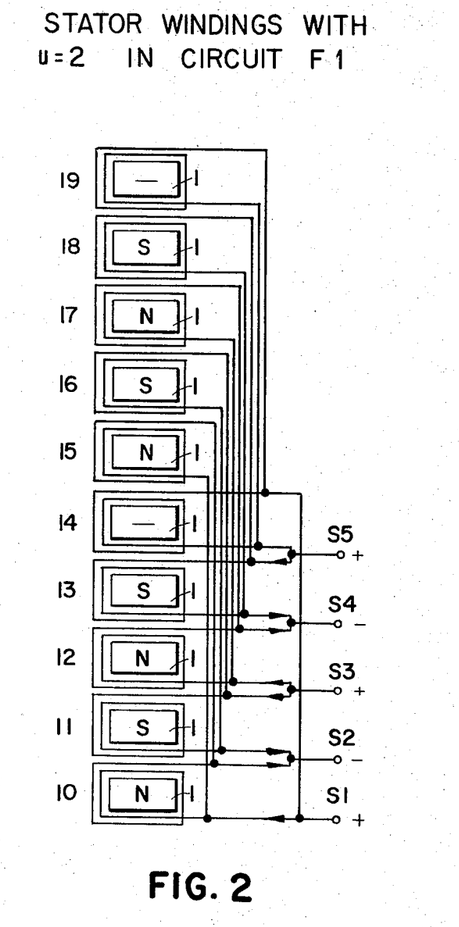
FIG. 2 is a schematic diagram illustrating the windings of a stator in FIG. 1, wherein $u = 2$.
Figure 3:
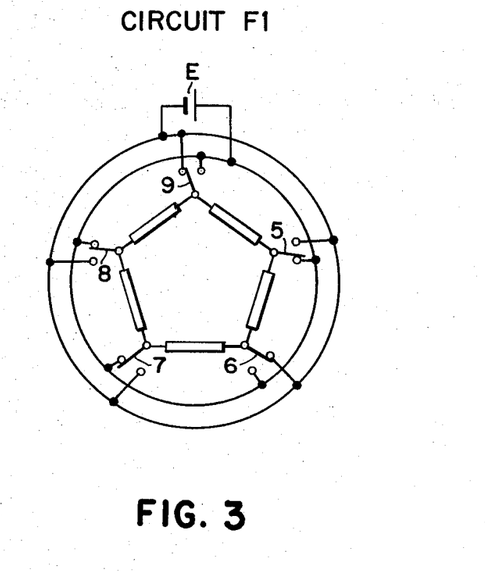
FIG. 3 is a schematic circuit diagram illustrating the principle of a circuit F1 wherein windings corresponding to the windings of FIG. 1 are energized, and which corresponds to the winding system used in FIG. 2.

The thus formed five phase windings are connected to each other to form a closed pentagon as shown in FIG. 2. The resulting junction points are connected with the five mechanical or electronic reversing switches 5 through 9 and with the current supply E as shown in FIG. 3.

In the usual manner, the rotor is composed of a central magnet which is magnetized in the axial direction. Tangentially toothed pole caps or pole shoes 3 of soft magnetic material carry the magnetic flux lines of the central magnet. As shown in FIG. 1', the teeth 4 of the two pole caps or pole shoes are tangentially offset relative to each other by one half-pole division.

According to an aspect of the invention, the following are of critical importance in the construction of the motor. The stator poles of FIG. 1 must be related as follows:

$$\tau_p = n\,\tau_z + \alpha\,i\,\alpha = \tau_z(K + 0.6)$$

$$\tau_p' = n\,\tau_z + \beta\,i\,\beta = \tau_z(K' + 0.6)$$

The number $T_r$ of rotor teeth thus abide by the general relation $$T_r = u(5n + 4K + K' + 3).$$

The stepping angle is thus $$\phi_o = 360/2mT_r$$

In the above, $u$ is the number of pole groups distributed on the stator circumference, $m$ is the phase number, $n$, $K$, and $K'$ are whole numbers which are chosen on a practical basis. They influence the size of the stepping angles and the winding technique. For large motor units, it is advantageous to chose small stepping angles considering the rotor moment of inertia. On the basis of the assembly of the winding, the values $K$ and $K'$ should not be too small. However, on the basis of efficiency laws, these values should not be made too large.

Figure 7:
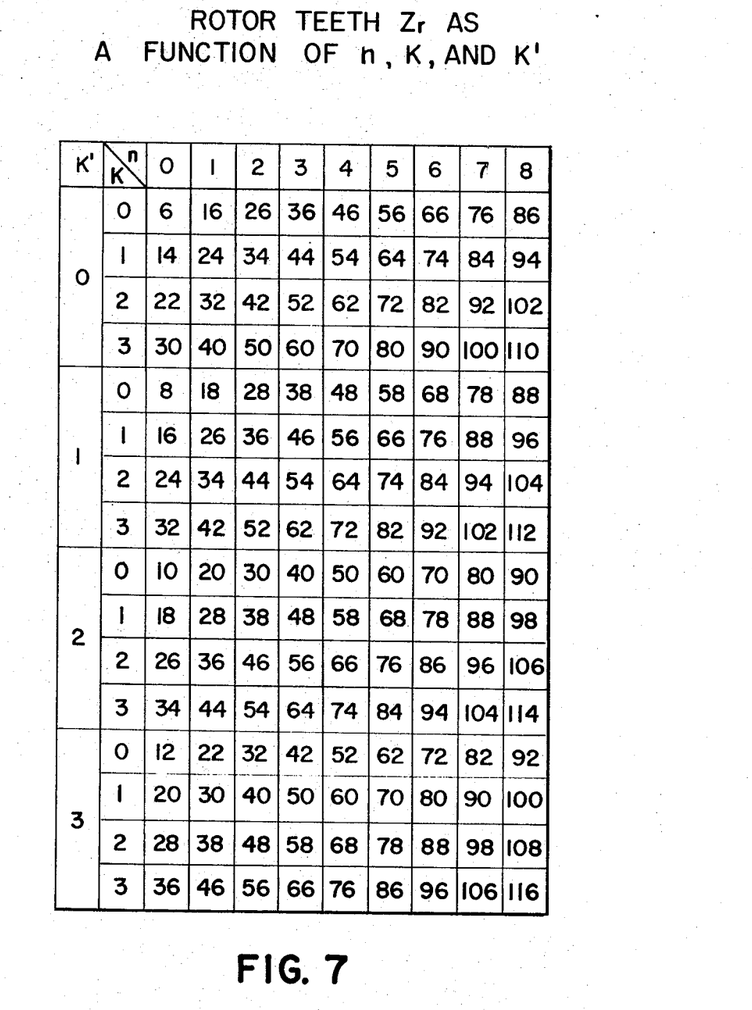
FIG. 7 is a table indicating the number of rotor teeth $T_r$ for different values of $n$, $K$, and $K'$ when $u = 2$ and $m = 5$.

FIG. 7 is a table indicating the number of rotor teeth $T_r$ for different values of $n$, $K$, and $K'$ when $u = 2$ and $m = 5$.

Figure 5:
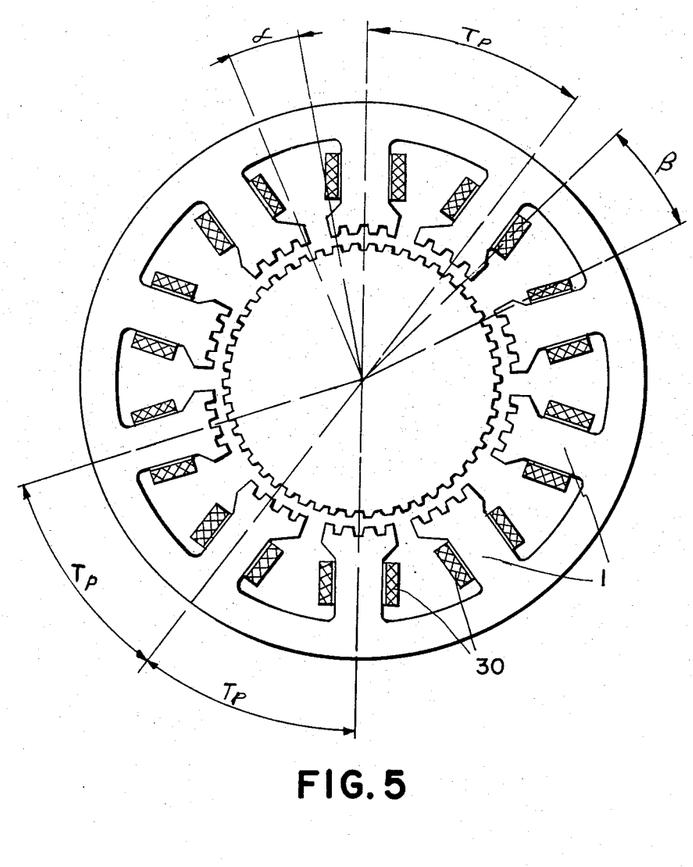
FIG. 5 is a somewhat schematic sectional illustration of another motor embodying features of the invention.
Figure 6:
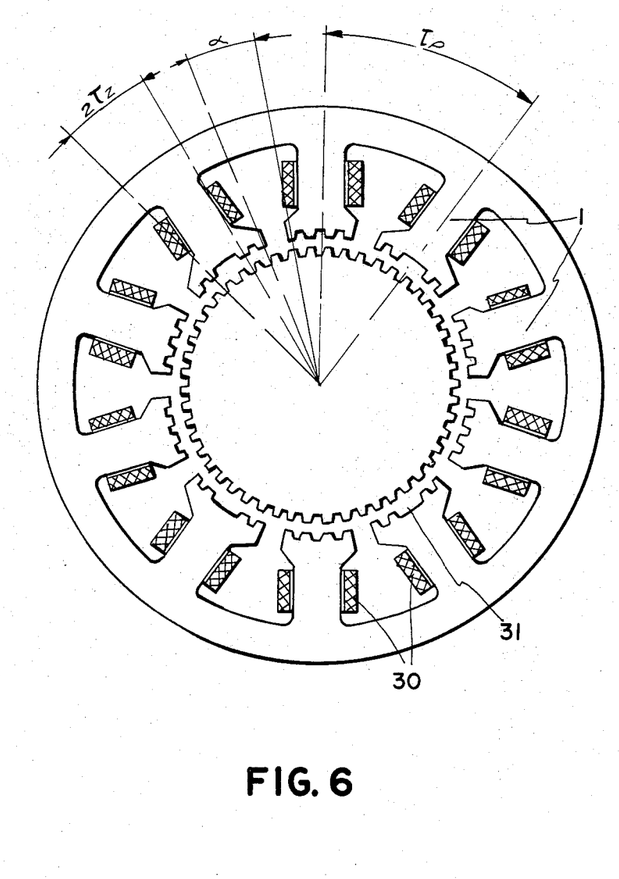
FIG. 6 is a schematic section illustrating still another motor embodying features of the invention.

Generally, in a motor embodying features of the invention, the main pole distances and group distances are not equal. Only in the special case where $K = K'$ and $\alpha = \beta$ are these distances equal. Under those circumstances distribution of the main pole distances over the entire circumference will be equal as shown in FIGS. 5 and 6.

Included among the critical aspects of the invention, the stator windings 30, for example those designated 10 to 14 and 15 to 19, should be switched in such a manner that the pole sequence alternates at the stator main poles as shown in FIG. 2. This means that one north pole will always follow a south pole. According to the invention, this is achieved without significant expenditure for electronic equipment with the five phase circuit of the aforementioned copending application Ser. No. 294,787, in which one phase winding always remains unexcited. As a result, contrary to known homopolar motors, no magnetic coupling of two adjacent poles occurs for any switching conditions.

The consequence of this is the avoidance of coupling oscillations which are induced or excited by the control pulses, thereby permitting an increase of the stable start-stop frequency of at least a multiple of four to five relative to known motors of the same size. Moreover, regardless of the respective switch positions, the magnetic flux through the useful air gap remains concentrated or bundled uniformly at all times. Scattering or straight flux is thus largely prevented or minimized. The efficiency or output of the motor is improved by about 50 percent.

Another important aspect of the invention resides in the fact that the rotor teeth are trapezoidally-shaped. The ratio of tooth width to tooth gap is 1:2 at the outer diameter rotor and approximatedly 2:1 at the diameter of the rotor base of the tooth. Tests have demonstrated that this maximizes the motor power.

Motors embodying the construction, switching and control of the features of the invention, are superior to presently known types of stepping motors having permanent magnet rotors and otherwise exhibiting this same structural size. Disregarding the slightly greater electronic equipment necessary for control, this superiority applies to the output and efficiency, the holding momentum, the step stability, the available steps per second, the start and stop behavior at large stepping frequencies, and the lower limit of the stepping angle. Thus, motors embodying the invention exhibit a substantial technical improvement in the field of stepping motors.

Figure 4:
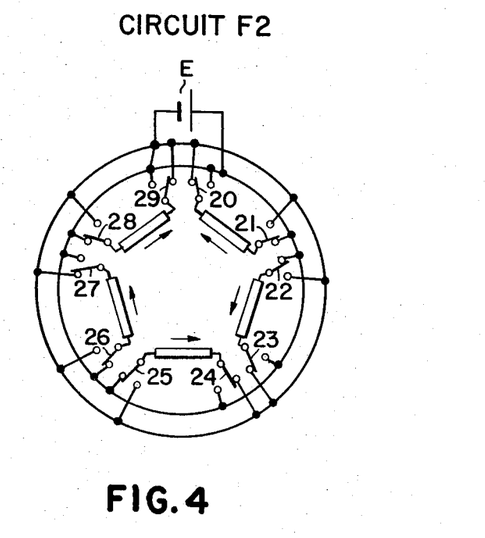
FIG. 4 is a schematic diagram illustrating the principle of another circuit F2, wherein windings comparable to those shown of FIG. 1 are suitably energized.

According to an embodiment of the invention, additional bisection or halving of the stepping angle is obtainable without changing the motor construction by using the control circuit F2 having ten reversing switches 20 to 29 as shown in FIG. 4. This, of course, involves additional expenditures for electronic control equipment.

FIGS. 8, 9, 10a to 10e, 11a to 11j, and 12a to 12c and 13 correspond to figures in the aforementioned application Ser. No. 294,787. The following refers to these figures for the purpose of describing the operation in this copending application.

Figure 8:
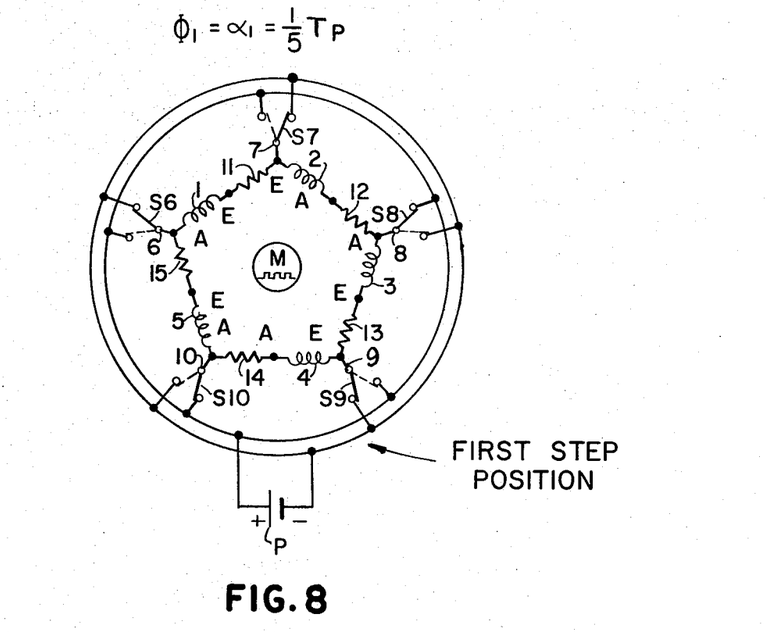
FIG. 8 is a schematic representation of a five phase stepping motor system described in the copending application Ser. No. 294,787.

In the embodiment of the invention illustrated in FIG. 8, five stator windings 1, 2, 3, 4, and 5 are connected in a series looped to form a pentagon similar to the manner in which three windings of a three-phase motor are connected to formm a delta connection. The pentagon connection produces five nodes 6, 7, 8, 9, and 10 at the five interconnecting points. Five transfer switches S6, S7, S8, S9, and S10 have respective armatures connected to the nodes 6, 7, 8, 9, and 10 and serve to connect each of the nodes selectively either to the positive or negative terminal of a power source P. During the first step of the stepping motor operation, the switches assume the positions shown. The characters A and E denote the winding directions of the windings 1, 2, 3, 4, and 5. Thus, in the positions shown during the first step, the winding 1 is short-circuited and the windings 2, 3, 4, and 5 simultaneously produce magnetizations of the same magnetic polarity, such as north.

Figure 9:
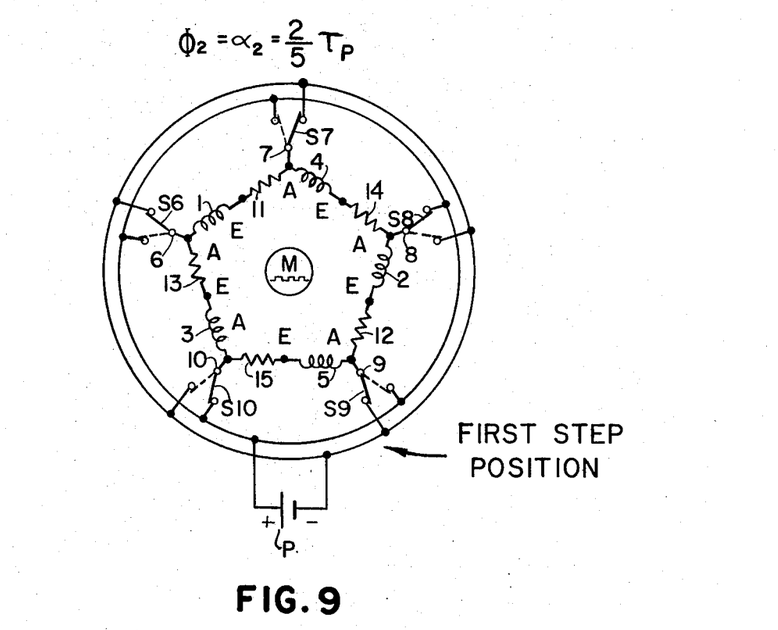
FIG. 9 is a schematic representation of a stepping motor system also described in the copending application Ser. No. 294,787.

FIG. 9 corresponds to FIG. 8. Here, the switches S6, S7, S8, S9, and S10 are also shown in the position corresponding to the first step of the stepping motor. These positions are identical to the positions in FIG. 9a. However, in the embodiment of FIG. 3b the windings 1, 2, 3, 4, and 5 are arranged in the winding order 1, 4, 2, 5, and 3. The characters A and E identify the winding directions, as stated.

The switches S6, S7, S8, S9, and S10 form part of a control circuit which switches the switches back and forth between positive and negative poles through a predetermined cycle. Each stator and rotor is divided into individual poles with the stators having an interpolar distance $T_p$ between individual adjacent poles. In order to obtain predetermined uniform rotary stepping angles, the rotary displacement between the adjacent stators or rotors within the pole distance $T_p$ can be $\phi_1 = 1/5T_p$, or $\phi_2 = 2/5\ T_p$.

FIG. 8 illustrates the wiring for producing an angle of rotation $\phi_1$ and FIG. 9 illustrates the winding required for producing the angle of rotation $\phi_2$.

FIGS. 10a through 10e illustrate the switch positions of the switches S6, S7, S8, S9, and S10 during a series of steps. It also implicitly represents the voltages appearing at the nodes 6 through 10.

Each of FIGS. 11a through 11e illustrates the polarity of magnetization of one pole in each of the stators energized by the windings 1 through 5 during the first eleven steps in the system of FIG. 8. Each of FIGS. 11f through 11j illustrates the polarity of magnetization of one pole in each of the stators energized by the windings 1 to 5 during the first eleven steps in the system of FIG. 9.

Figure 10A:
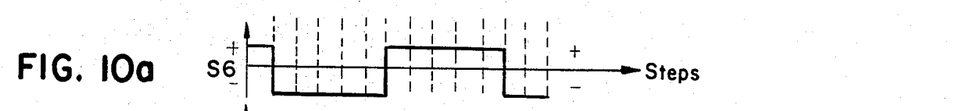
FIGS. 10a through 10e are voltage-step diagrams illustrating the switch-actuating sequence, and hence the voltages at the corresponding nodes, at the varying switches in FIGS. 8 and 9 described in the copending application Ser. No. 294,787.
Figures 10B, 10C:
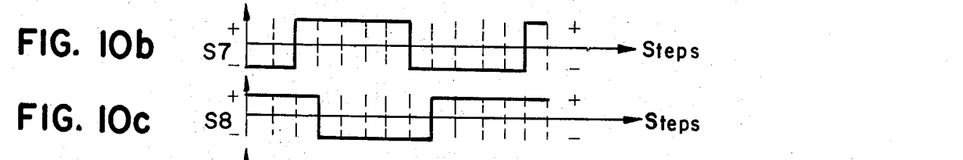
Figures 10D, 10E:
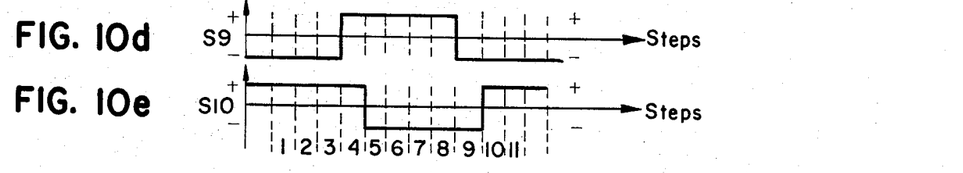
Figures 11A, 11B:
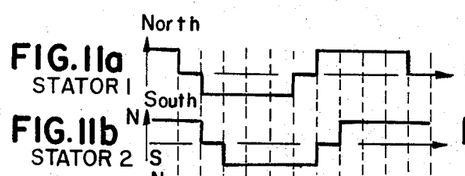
FIGS. 11a through 11e illustrate the magnetic polarizations of the windings in the system of FIG. 8 when the switches are shifted step-by-step as shown in FIG. 10 as described in the copending application Ser. No. 294,787.
Figure 11C:
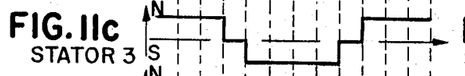
Figure 11D:
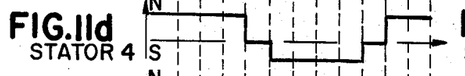
Figure 11E:
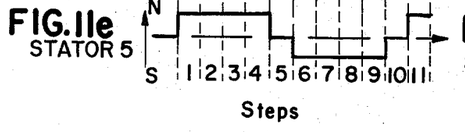
Figure 11F:
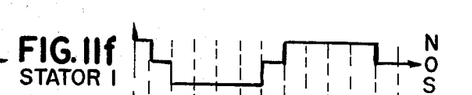
FIGS. 11f through 11j illustrate the magnetic polarities of the five-stator windings in FIG. 9 when the switches are operated as shown in FIG. 10 to produce the corresponding node voltages as described in the copending application Ser. No. 294,787.
Figure 11G:
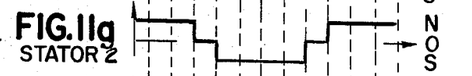
Figure 11H:
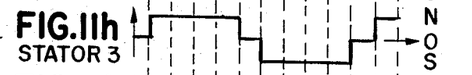
Figure 11I:
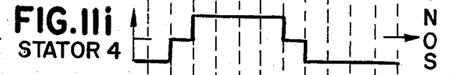
Figure 11J:
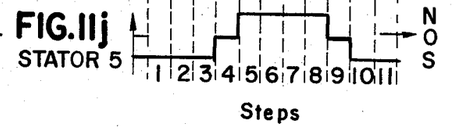
Figure 12A:
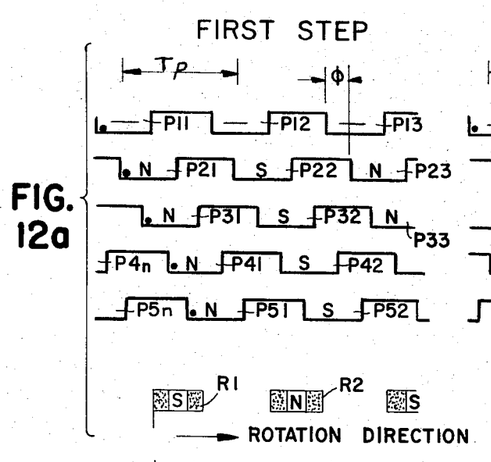
FIGS. 12a to 12f are graphic diagrams illustrating the relationships of the magnetizations of the stators and rotors in FIG. 9a when energized according to the diagram of FIGS. 10a through 10e as described in the copending application Ser. No. 294,787.

FIG. 12a illustrates the position of the stator poles P11, P12,...P1n; P21, P22,...P2n; P31, P32,...P3n; P41, P42, ...P4n; and P51, P52,...P5n of the respective stators 1, 2, 3, 4, and 5 relative to each other and relative to the rotor poles R1, R2,...during the first step in the system of FIG. 9a when energized as shown in FIG. 10 and operating as shown in FIG. 11a. It is assumed here that the stators, which are fixed relative to each other, rotate relative to the rotor which is fixed. For simplicity, the stators have been designated with the same reference numerals as the windings which they carry.

Figure 12B:
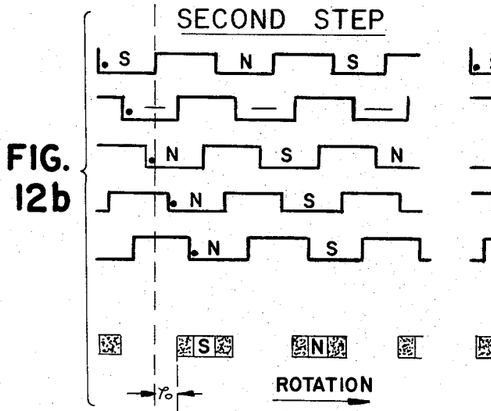
Figure 12C:
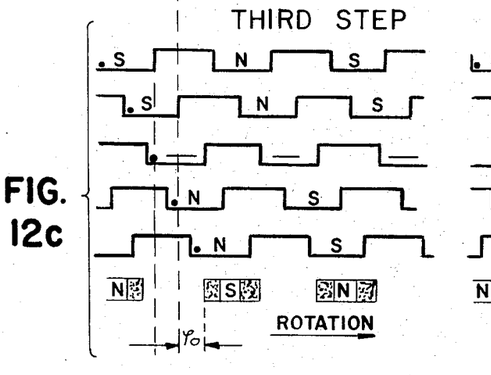
Figure 12D:
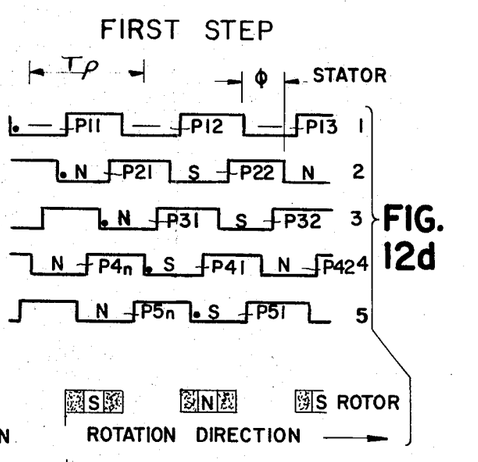
Figure 12E:
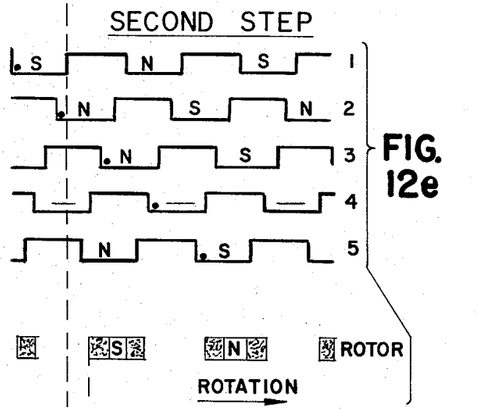
Figure 12F:
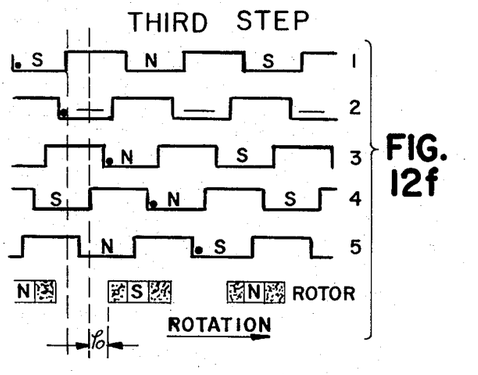

FIGS. 12b and 12c illustrate the same relationships between the stator poles and rotor poles as FIG. 12a, but for the second and third steps. FIGS. 12d through 12f illustrate the same relationships for the system in FIG. 9 when energized as in FIG. 10 and operating as shown in FIG. 11b.

As can be seen from FIGS. 8, 9, 11a, and 11b, four windings carry current during each step. That is to say, four stators are energized simultaneously. The fifth winding is short-circuited either to the negative or positive terminal of the voltage source.

Energizing only four out of five windings may appear to produce some disadvantages. However, it ultimately results in higher efficiency. If it is assumed that the static torque characteristics of the individual stators follow a sinusoidal course, excitation of all five stators, produces a characteristic holding moment which is 3.2 times the value of the maximum moment of a single stator. However, when four stators are simultaneously excited, the characteristic holding moment is 3.1 times the value of the maximum moment of a single stator. Thus, energizing four windings instead of five produces a reduction in the holding moment which degrades the dynamic performance by only about 5 percent. The stepping angle and the waviness of the operating torque exhibit substantially the same value when four stators are energized as when five stators are energized.

However, energizing only four of five stator winding at any one time reduces the required input power approximately 20 percent. As a result, the total efficiency increases 15 percent with about 20 percent less heating of the motor. Making power comparisons, the motor heating within an insulation class represents a reference point. Thus, the power and hence the maximum moment of a single stator can be raised about 20 percent when only four stators are excited. As a result, circuits embodying the present system exhibit an approximately 15 percent higher holding moment than circuits energizing all five windings simultaneously.

The fifth, non-excited winding is always short-circuited. Thus, the electromotive force which the permanent magnet rotor induces into the short-circuited winding during a stepping operation produces a damping effect on the motor system. Therefore, at higher stepping frequencies the operating torque is again somewhat reduced. However, the degree of damping which is relatively low in all electric stepping motors increases. This reduces undesirable pendular vibrations of the rotor.

Figure 13:
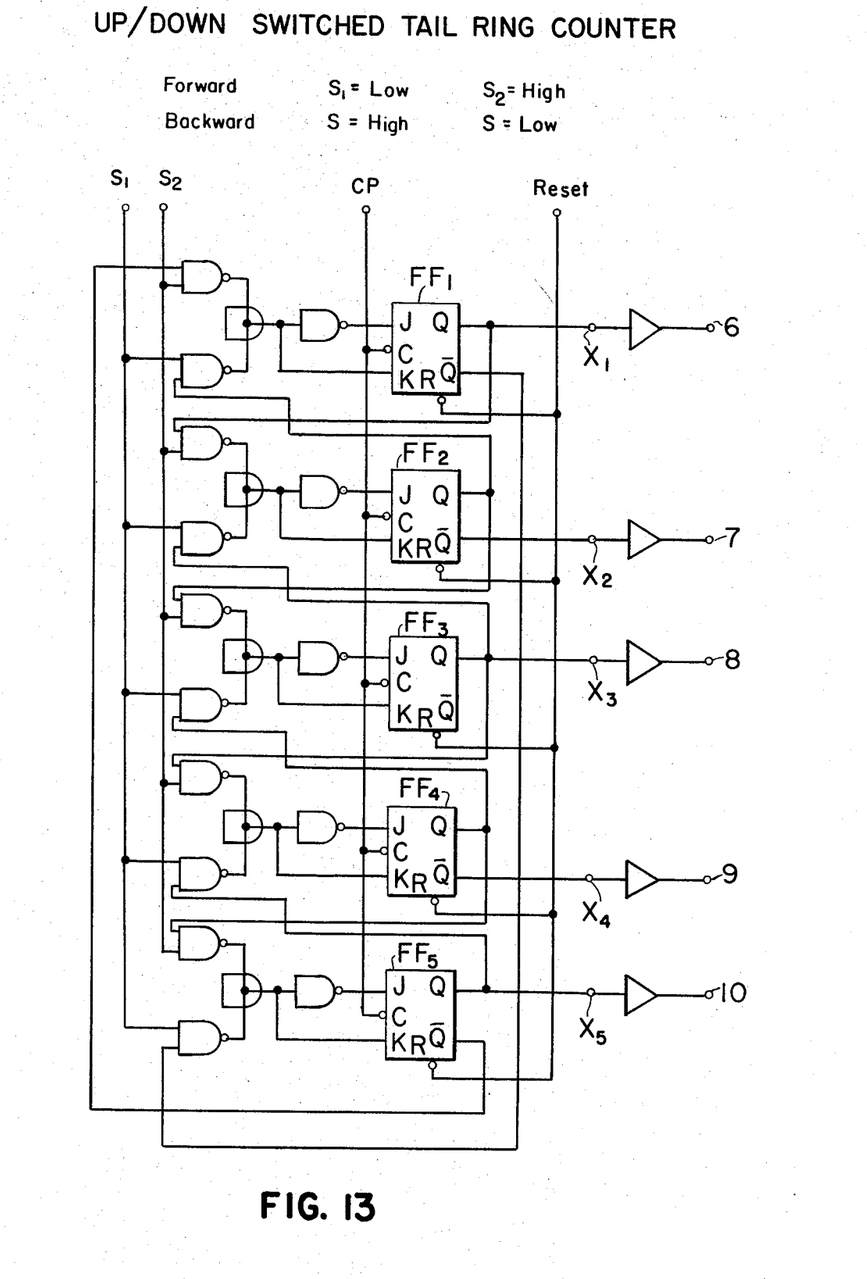
FIG. 13 is a logic diagram for forming the switches of FIGS. 8 and 9 in the copending application.

FIG. 13 is a logic diagram for forming the switches in FIGS. 8 and 9.

The term "pitch" is used herein as the angle between centers or other like portions of adjacent parts.

The characters $\tau_p$, $\tau_p'$, $\tau_z$, $\alpha$ and $\beta$ are defined by their showing on the drawings.

While specific embodiments of the invention have been shown and described in detail to illustrate the application of the inventive principles, it will be understood that the invention may be embodied otherwise without departing from such principles.

What is claimed is:

1. A five phase stepping motor system, comprising a stepping motor having five untapped stator windings connected said stator windings forming a plurality of connecting points, a permanent magnet rotor, control means connected to said five connecting points for energizing said windings, said stepping motor including $u$ groups each having five main poles, each of said main poles having $n + 1$ pole teeth, said stator windings being distributed on said groups and poles, said poles being divided in accordance with the relations $$\tau_p = n\ \tau_z + \alpha\ i\ \alpha = \tau_z(K + 0.6)$$
$$\tau_p' = n\ \tau_z + \beta\ i\ \beta = \tau_z(K' + 0.6),$$

the ratio of rotor tooth widths to stator tooth widths at the outer diameter of the rotor being equal to or smaller than unity, the number of rotor teeth $T_r$ corresponding to the relationship $T_r = u(5n + 4K + K' + 3)$, where $\tau_p$ is the pitch of adjacent main poles, $\tau_z$ is the pitch of adjacent pole teeth, $\alpha$ is the angle between adjacent pole teeth on adjacent poles, $\tau_p'$ is the pitch between adjacent poles on adjacent groups, $\beta$ is the angle between adjacent pole teeth on adjacent groups and $n$, $K$, and $K'$ are whole numbers equal to or greater than 0.

2. A motor as in claim 1, wherein said control means short-circuits one of said windings while energizing the others of said windings simultaneously and shifts the short-circuited winding in succession from winding to winding while simultaneously energizing the remaining ones of said windings.

3. A motor as in claim 1, wherein said control means include means for connecting said winding in a pentagonal loop.

4. A motor as in claim 2, wherein said control means include means for connecting said winding in a pentagonal loop.

5. A motor as in claim 1, wherein said control means connects the stator winding so that the main poles always exhibit alternating polarity.

6. A motor as in claim 2, wherein said control means connects the stator winding so that the main poles always exhibit alternating polarity.

7. A motor as in claim 3, wherein said control means connects the stator winding so that the main poles always exhibit alternating polarity.

8. A motor as in claim 1, wherein said control means energizes each of said windings so that two of successive ones of said windings have current flowing in the same direction while the remainder of the successive windings have currents flowing in opposite directions.

9. A motor as in claim 1, wherein said control means connects the windings so that, independent of the switching position, two adjacent main poles always have the same polarity while the others, have alternating polarities.

10. A motor as in claim 1, wherein said pole teeth have trapezoidal shapes, the ratio of tooth width to tooth gap at the outer diameter of the rotor being 1:2 and at the tooth root about 2:1.

11. A motor as in claim 3, wherein said pole teeth have trapezoidal shapes, the ratio of tooth width to tooth gap at the outer diameter of the rotor being 1:2 and at the tooth root about 2:1.

12. A motor as in claim 1, wherein each main pole has $n + 1$ pole teeth, the ratio of stator to rotor tooth width being 2:1.

13. A motor as in claim 3, wherein each main pole has $n + 1$ pole teeth, the ratio of stator to rotor tooth width being 2:1.

14. A motor as in claim 1, wherein said control means can switch the individual windings in series connection and parallel connection.

15. A motor as in claim 1, wherein $\tau_p = \tau_{p'}$.

16. A motor as in claim 3, wherein $\tau_p = \tau_{p'}$.

17. A motor as in claim 4, wherein $\tau_p = \tau_{p'}$.

18. A motor as in claim 1, wherein $\alpha = \beta$ and at least one of said main poles has tooth gaps.

19. A motor as in claim 3, wherein $\alpha = \beta$ and at least one of said main poles has tooth gaps.

20. A motor as in claim 14, wherein $\alpha = \beta$ and at least one of said main poles has tooth gaps.

* * * * *